United States Patent
Yang et al.

(10) Patent No.: US 10,162,336 B2
(45) Date of Patent: Dec. 25, 2018

(54) NUMERICAL CONTROL SYSTEM BASED ON VIRTUAL HOST COMPUTER

(71) Applicant: HUAZHONG UNIVERSITY OF SCIENCE AND TECHNOLOGY, Wuhan, Hubei (CN)

(72) Inventors: Jianzhong Yang, Hubei (CN); Bingyan Feng, Hubei (CN); Enming Hui, Hubei (CN); Guotao Ding, Hubei (CN); Yongliang Lu, Hubei (CN)

(73) Assignee: HUAZHONG UNIVERSITY OF SCIENCE AND TECHNOLOGY, Wuhan, Hubei (CN)

( * ) Notice: Subject to any disclaimer, the term of this patent is extended or adjusted under 35 U.S.C. 154(b) by 218 days.

(21) Appl. No.: 15/113,345

(22) PCT Filed: Jun. 12, 2015

(86) PCT No.: PCT/CN2015/081292
§ 371 (c)(1),
(2) Date: Jul. 21, 2016

(87) PCT Pub. No.: WO2016/145738
PCT Pub. Date: Sep. 22, 2016

(65) Prior Publication Data
US 2017/0045879 A1    Feb. 16, 2017

(30) Foreign Application Priority Data
Mar. 13, 2015    (CN) .......................... 2015 1 0111457

(51) Int. Cl.
*G05B 19/409*    (2006.01)
*G05B 19/414*    (2006.01)

(52) U.S. Cl.
CPC ......... *G05B 19/409* (2013.01); *G05B 19/414* (2013.01); *G05B 2219/23067* (2013.01)

(58) Field of Classification Search
CPC .................................................. G05B 19/409
(Continued)

(56) References Cited

U.S. PATENT DOCUMENTS 4,245,316 A * 1/1981 Koikawa ............ G05B 19/4065
340/680
6,067,477 A * 5/2000 Wewalaarachchi .. G05B 19/418
700/17

(Continued)

FOREIGN PATENT DOCUMENTS

| CN | 102736553 | 10/2012 |
| CN | 102749885 | 10/2012 |

(Continued)

OTHER PUBLICATIONS

Long, Yi-Hong, et al. "Embedded-based modular NC systems." The International Journal of Advanced Manufacturing Technology 40.7-8 (2009): pp. 749-759.*

(Continued)

*Primary Examiner* — Satish Rampuria
(74) *Attorney, Agent, or Firm* — Hamre, Schumann, Mueller & Larson, P.C.

(57) ABSTRACT

A numerical control (NC) system based on a virtual host computer is described. The NC system includes the virtual host computer arranged on a remote server, a local lower computer, and a human-machine interactive device. The human-machine interactive device provides a human-machine interactive input/output interface. The virtual host computer integrates a human-machine interactive module, a non-real-time/half-real-time task execution unit and a lower-computer control unit, and receives an NC machining instruction, processing the instruction to form a machine-tool control instruction through the non-real-time/half-real-time task execution unit, and transmitting the control data to the local lower computer through the lower-computer con- (Continued)

trol unit utilizing a network. The local lower computer controls a machine tool to execute real-time motion control and logic control.

9 Claims, 3 Drawing Sheets

(58) Field of Classification Search
USPC .................................................. 700/75–89
See application file for complete search history.

(56) References Cited

U.S. PATENT DOCUMENTS

| | | | |
|---|---|---|---|
| 2002/0133264 A1* | 9/2002 | Maiteh | G05B 19/4097 700/182 |
| 2007/0129826 A1* | 6/2007 | Kreidler | G05B 19/4183 700/83 |
| 2012/0062547 A1* | 3/2012 | Yamada | G09G 3/344 345/214 |
| 2015/0032248 A1 | 1/2015 | Bauer | |

FOREIGN PATENT DOCUMENTS

| | | |
|---|---|---|
| CN | 104298175 | 1/2015 |
| WO | 2013069886 | 5/2013 |

OTHER PUBLICATIONS

Kao, Yung-Chou, and Grier Ci Lin. "Development of a collaborative CAD/CAM system." Robotics and Computer-Integrated Manufacturing 14.1 (1998): pp. 55-68.*

Lin, Fuhua, Chuan-Jun Su, and Mitchell M. Tseng. "An agent-based approach to developing intelligent virtual reality-based training systems." Tools with Artificial Intelligence, 1999. Proceedings. 11th IEEE International Conference on. IEEE, 1999.pp. 1-8.*

International Search Report for international application No. PCT/CN2015/081292, dated Dec. 21, 2015 (5 pages).

* cited by examiner

NUMERICAL CONTROL SYSTEM BASED ON VIRTUAL HOST COMPUTER

FIELD OF THE INVENTION

The invention relates to the field of numerical control (NC) systems, and more particularly, to a NC system based on a virtual host computer.

BACKGROUND OF THE INVENTION

Figure 1:
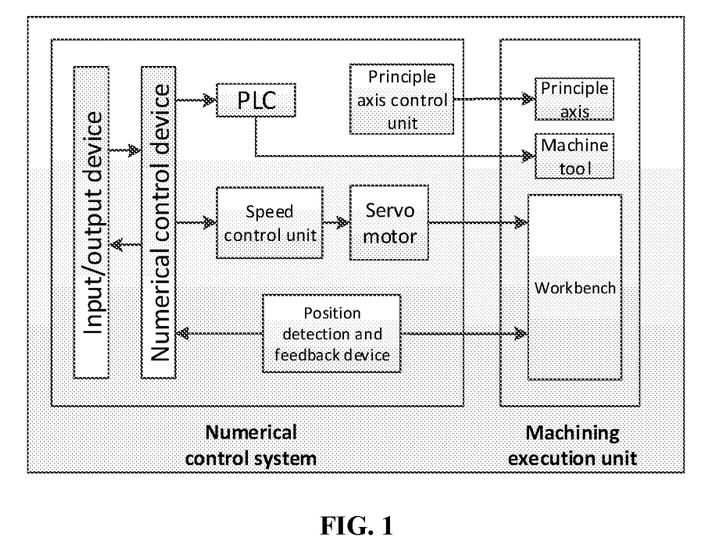
FIG. 1 illustrates an architecture of a NC system in the prior art.

As a flexible, high-efficiency and high-precision automatic machine tool, a NC machine tool can comparatively well solve complex, precise, small-amount or multi-type machining problems, and is generally composed of a NC system, a main body and other auxiliary devices. The NC system being a core of the whole NC machine tool is capable of integrating position (trajectory) control, speed control and torque control altogether, executing parts of or whole NC functions according to code instructions, and realizing motion control of one or more machineries. As shown in FIG. 1, a NC system normally includes an input/output device, a NC device, a programmable logic controller (PLC), a servo system, a detection and feedback device and the like, amongst which the NC device is a hard core of the NC system.

The NC device may include a display module, an input/output module, a decoder, a motion planner, an axis motion controller, a memory and the like. The display module is an important medium for human-machine interaction, and provides a visual operation environment for users. The input/output module is an interface for data and information exchange between the NC device and an external device, and is mainly used for inputting data such as NC machining programs, control parameters, compensation quantities and the like, and for outputting information such as servo drive, trajectory control and the like. The decoder is mainly used for decoding program segments of the NC machining program. The motion planner mainly facilitates speed processing and interpolation operation. The axis motion controller is an interface module between the NC device and a servo drive system and operates for position control. The memory is used for storing information such as machining programs, system configuration parameters, system inherent data and the like.

Figure 2:
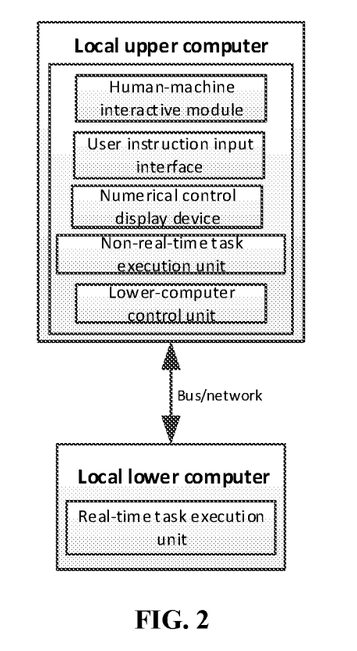
FIG. 2 illustrates an architecture of a NC system in the prior art, the architecture comprising an upper computer and a lower computer, the upper computer being HMI for handling non-real-time tasks of the system, and the lower computer comprising NCU and PLC for conducting real-time motion control and logic control of the system.

At present, a conventional mainstream high-grade NC system normally employs an architecture formed by an upper computer for handling non-real-time tasks and a lower computer for handling real-time tasks such as motion control and logic control. The architecture is extremely well applied to the numerical control field, communication between the upper computer and the lower computer and control thereof are comparatively easily realized, and the NC system based on the architecture possesses a distributed characteristic and partly supports secondary research and development by users and independent upgrading. In the architecture of a conventional NC system, the upper computer and the lower computer are both installed in the vicinity of a machine tool and are respectively provided with an industrial personal computer thereby being communicated with each other via the industrial personal computers in connection through a bus or a network, as shown in FIG. 2.

According to the current situation of the NC machining field that user requirements for functions and performances of the NC system are more and more high, conventional architectures formed by a single computer or by an upper computer and a lower computer both face the same challenge: how to improve the performances and the service capability of the NC system while keeping or reducing production cost. In recent years, increasingly complex computation process and integration demands of intelligent functions raise higher requirements for kernel and memory of a NC device and cause production cost rising pressure. The conventional architecture formed by the upper computer and the lower computer partly increases exploitation and upgrading difficulties of the NC system and blocks development of the NC system. Furthermore, complex functions of the NC system cannot be effectively utilized by an operator of a machine tool in a noisy chaotic environment of a workshop, which correspondingly causes resource waste and influences production efficiency of enterprises.

Therefore, the present conventional architecture formed by the upper computer and the lower computer causes the intelligent technology of the NC system to difficulty adapt to a more and more complex manufacture process, becomes a main bottleneck during development of the NC system towards intelligence, digitalization and multi-functionalization, and brings great difficulty for improving performances of the NC system.

The applicant's Chinese patent publication No. CN104298175A discloses a virtualization-based NC system, and the NC system comprises a local NC device and a remote server connected to each other. The remote server is used for providing high value-added functions for the NC system, such as rapid programming, data acquisition and processing, G code quality analysis and optimization, and the like, and also for handling a part of non-real-time tasks in a conventional NC system comprising an upper computer and a lower computer, such as decoding, machining simulation, input/pretreatment and the like. The server is connected with the NC device via a remote desktop client disposed on the NC device, and the client enables an operator to conduct virtual operation on the server via a human-machine interactive device (HMI) of the NC device by using virtualization technology, thereby remotely controlling and operating the server and facilitating usage of intelligent software service and NC machining control by cooperation of the server and the NC device.

In the above-mentioned technical scheme, the remote server is employed for providing high-end intelligent functions for the NC system and also for handling a part of non-real-time tasks originally processed by the upper computer in the conventional NC system, thereby improving the service capability of the NC system and the machining performance. However, the NC system still employs a conventional architecture formed by the upper computer and the lower computer and does not break through the conventional architecture since only a server is added for providing third-party services for the NC system. Although partly expanding functions of the NC system, the architecture still has many defects: firstly, as majority of computation related to machining (such as interpolation, speed planning and the like) is facilitated locally, machining performance and efficiency of the NC system are not greatly raised; secondly, because HMI is arranged locally, an operator must conduct NC machining operation in the field and correspondingly extensively-demanded remote machining control is greatly limited; and thirdly, function exploitation and performance raising of HMI are limited by local software and hardware resources and development of the NC system is severely restricted since the HMI is integrated on the local NC device.

SUMMARY OF THE INVENTION

In view of the above-mentioned problems, it is an objective of the invention to provide a NC system based on a virtual host computer for solving restriction problems of data processing capability, HMI function expanding and remote machining of a conventional NC system by arranging the upper computer in the remote server to form the virtual host computer, which is a new design for the NC system with the architecture formed by the upper computer and the lower computer.

In order to realize the above purposes, the invention provides the NC system based on the virtual host computer, and the NC system controls NC machining of a machine tool by arranging an upper computer in a remote server as a virtual machine thereby forming a virtual host computer, configuring the virtual host computer and a local lower computer thereby forming a new upper-computer and lower-computer combined architecture, and utilizing interaction of the virtual host computer and the local lower computer. The NC system mainly comprises the virtual host computer arranged at the remote server, the local lower computer and the HMI for human-machine interaction, and the virtual host computer is connected with the HMI and the local lower computer respectively via a network.

The HMI is used for providing a human-machine interactive input/output interface allowing a NC machining instruction to be input. The virtual host computer integrates a human-machine interactive module for facilitating human-machine interaction, a non-real-time/half-real-time task execution unit for executing non-real-time/half-real-time tasks (such as decoding and off-line speed planning) during NC machining, and a lower-computer control unit for controlling NC machining. The virtual host computer receives the NC machining instruction input by the HMI via the human-machine interactive module, processes the NC machining instruction via the non-real-time/half-real-time task execution unit thereby forming a machine-tool control instruction, and further transfers control data to the local lower computer via the lower-computer control unit by utilizing network transmission; and the local lower computer receives the control data from the virtual host computer and further controls a machine tool to conduct real-time motion control and logic control.

The invention establishes the virtualization-based NC system by deploying the human-machine interactive module in the virtual machine of the remote server through virtualization technology thereby forming the virtual host computer for replacing a conventional local upper computer and utilizing interaction of the virtual host computer and the local lower computer via network, so that restriction of improving system machining performance and functions by software and hardware resource of a conventional NC system is broken through, the local NC device is simplified, contradiction between service capability of the NC system and production cost is greatly weakened, and maintenance difficulty of the NC system in the workshop and production cost of enterprises is reduced.

In a class of this embodiment, the HMI integrates a remote desktop client allowing information interaction with a remote desktop server integrated at the remote server.

In a class of this embodiment, an interface of the HMI is a virtual interface generated by obtaining desktop image information of the upper computer from the virtual host computer and is essentially a copy of the desktop of the virtual host computer.

In a class of this embodiment, one single remote server may comprise multiple virtual host computers respectively corresponding to multiple local lower computers, so that the single remote server may simultaneously provide services for the multiple local lower computers.

In a class of this embodiment, one same NC system may be provided with multiple human-machine interactive devices respectively connected with the virtual host computer via a network thereby providing a human-machine interactive interface, and the interactive interfaces displayed by the multiple human-machine interactive devices corresponding to the virtual host computer are synchronous.

In a class of this embodiment, the HMI is arranged locally or at any position that a network can reach.

In a class of this embodiment, the HMI is a portable terminal.

The HMI in the present invention is only used for handling simple human-machine interaction tasks such as output display and inputting of user instructions (such as mouse, keyboard and the like), and feeds user instructions back to the virtual host computer for processing without participating in response to control instruction or directly controlling the local lower computer. An operator does not feel existence of the remote server and the virtual host computer and employs an operation mode same to that of a conventional NC system when conducting machining operation on the human-machine interactive interface of the HMI, and therefore the operation mode is highly compatible with a conventional NC operation mode and operation localization is facilitated.

The invention preferably employs data lightweight technology for real-time image data transmission between the virtual host computer and the HMI, so that common industrial bandwidth is capable of meeting real-time image data transmission request. In the meantime, the invention preferably employs a method of refreshing a rectangular region for solving the speed problem of instantly refreshing the human-machine interactive interface, thereby completely guaranteeing user experience of an operator.

In the present invention, the human-machine interactive module is capable of conveniently integrating third-party software and providing high-end intelligent service for the NC system by taking the virtual host computer as a carrier. Preferably, the human-machine interactive module is integrated in the virtual host computer in a form of utility software and possesses a cross-platform characteristic and high portability. When being started, the human-machine interactive module will actively make a request for being connected with the local lower computer via a network and acquires a desktop size of the virtual host computer thereby automatically adjusting a resolution of the virtual human-machine interactive interface and guaranteeing optimum display effect at the client.

As a host machine of the virtual host computer, the remote server provides high-performance kernel, elastic memory and hard-disk space, powerful computing capability and the like for the virtual host computer, and optimizes and improves the machining performance of the upper computer of the NC system.

In the present invention, the NC system based on the virtual host computer arranges a system backup unit at the remote server and enables the virtual host computer to be rapidly recovered by means of the backup unit when irreversible failure happens, thereby improving the reliability of the whole NC system.

To summarize, the present invention comprises the following advantages over the prior art:

(1) the NC system of the invention employs the virtual host computer for replacing a local upper computer and configures the virtual host computer and the local lower computer for forming the new architecture, thereby simplifying the local NC device and substantially reducing production cost of enterprises and maintenance difficulty of the NC system.

(2) the above-mentioned architecture enables function exploitation and performance improvement of the upper computer of the NC system to be not restricted by local software and hardware resources, and is capable of improving the data processing capability of the upper computer and optimizing the machining performance of the NC system by means of powerful software and hardware resources and computing capability of the remote server.

(3) the human-machine interactive module does not depend on a specific operation system and can be conveniently ported when being required to run in a new environment or operation system.

(4) the virtual host computer arranges a system backup unit at the remote server to which the virtual host computer belongs and can be rapidly recovered by means of the backup unit when irreversible failure happens, thereby improving the reliability of the NC system.

(5) the invention is capable of flexibly allocating, expanding and upgrading virtual software and hardware resources for the virtual host computer according to the machining requirements of the NC machine tool by utilizing virtualization technology, thereby substantially improving expandability and resource utilization rate of the NC system.

(6) the remote desktop client can be integrated at any HMI such as PC, flat computers, handsets and the like by utilizing virtualization technology, and therefore the NC machining process is not restricted by a monitoring device and a monitoring site, and machining reliability and production efficiency of a machine tool are indirectly improved.

(7) the virtual host computer is capable of conveniently integrating third-party software, thereby improving the situation that the conventional architecture restricts development of the NC system towards intelligence and multi-functionalization, improving the service capability of the NC system, and also facilitating an operator to expand functions of the NC system according to actual demands.

SPECIFIC EMBODIMENT OF THE INVENTION

For clear understanding of the objectives, technical scheme and advantages of the invention, detailed description of the invention will be given below in conjunction with accompanying drawings and specific embodiments. It should be noted that the embodiments are only meant to explain the invention, and not to limit the scope of the invention.

Figure 3:
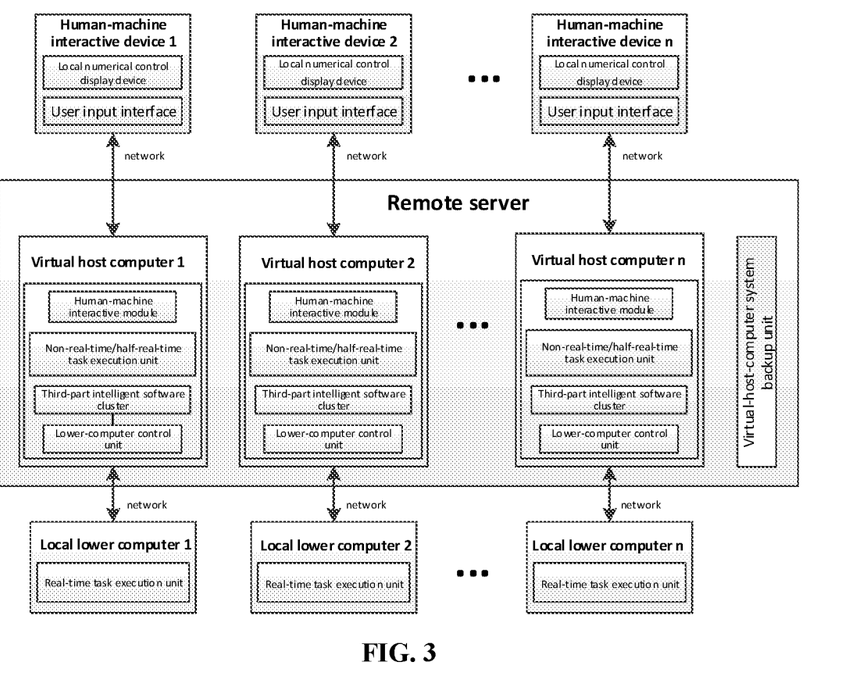
FIG. 3 illustrates the architecture of a local NC system based on a virtual host computer according to an exemplary embodiment of the invention.

An exemplary mode provided by an embodiment of the invention is shown in FIG. 3, the NC system in the mode (which is called as a local NC system in the embodiment) comprises virtual host computers, local lower computers and local NC display devices. The virtual host computers run at the remote server for handling non-real-time/half-real-time tasks of the NC system, such as rapid programming, decoding, G code simulation and optimization, off-line speed planning, analysis and storage of machining data and the like, and providing control data to the local lower computer. The local lower computers are used for receiving the control data from the corresponding virtual host computers and executing real-time motion control and logic control. The local NC display devices are used for providing local virtual human-machine interactive interfaces for operators and transmitting user instructions to the corresponding virtual host computers for processing.

The above-mentioned mode allows the NC system to locally maintain local lower computers and simple display devices, thereby greatly simplifying local software and hardware devices of the NC system and reducing production cost of enterprises as well as maintenance difficulty of the NC system. In conducting machining operation on one local NC display device, the operator does not feel existence of the remote server and the corresponding virtual host computer and operates like on a conventional NC system. Therefore, the mode is compatible with a conventional machining operation mode and enhances the intelligence degree of the NC system by localizing remote operation, and improves the machining performance of a machine tool by increasing the data processing capability of the upper computers of the NC system.

Figure 4:
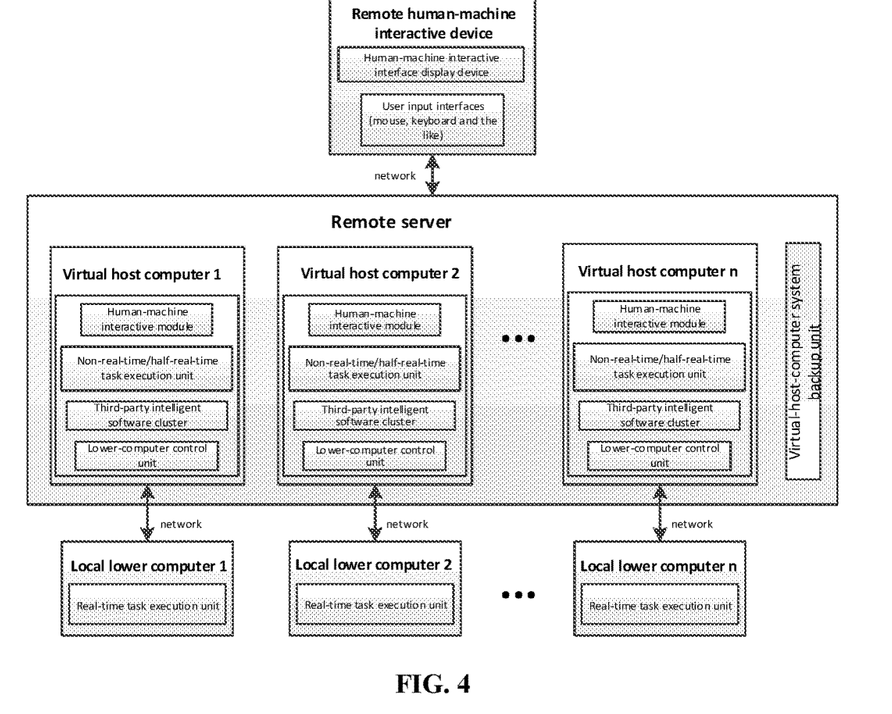
FIG. 4 illustrates the architecture of a remote NC system based on a virtual host computer according to an exemplary embodiment of the invention.

Another exemplary mode provided by another embodiment of the invention is shown in FIG. 4, the human-machine interactive devices in the mode can be any display terminals within a network's coverage area, such as PCs, flat computers, handsets and the like, rather than local NC display devices, and the NC system in the mode is called as a remote NC system since an operator can remotely monitor NC machining by remotely accessing the virtual host computers. The mode allows the NC system to simply maintain local lower computers, thereby simplifying the local NC device. Additionally, as the human-machine interactive devices can be arranged at any position within a network's coverage area, the operator no longer needs to stay in a noisy working environment of a workshop, and thereby improving the accuracy of machining operation.

Figure 5:
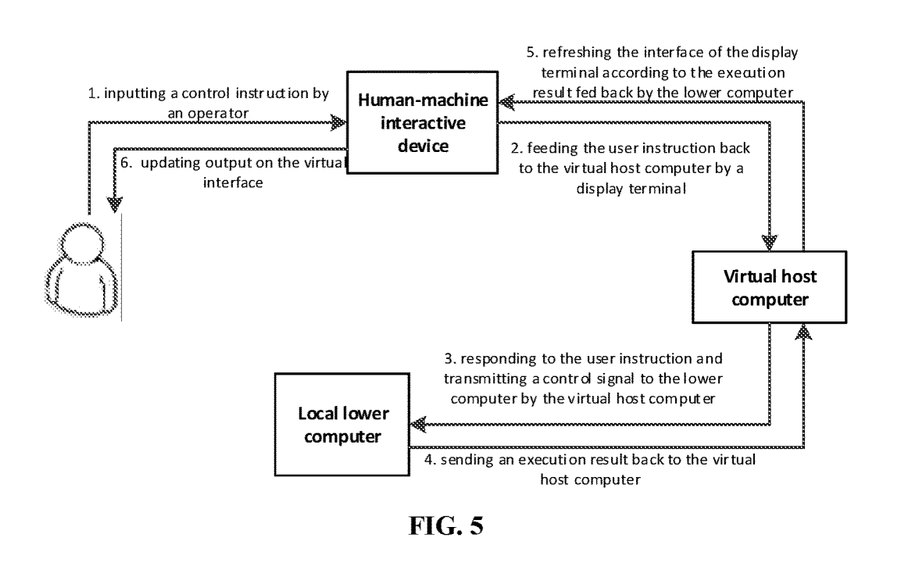
FIG. 5 is a flowchart illustrating a process of controlling a local lower computer by an operator of a NC system based on a virtual host computer of the invention.

FIG. 5 is a flowchart illustrating a process of remotely controlling the local lower computer through the HMI. An operator seems to control the machining process of a machine tool directly through the remote HMI without feeling existence of the remote server and the virtual host computer both running in the background.

The virtual host computers in the above two embodiments respectively employ a remote server as a carrier, thereby greatly improving control performance and expandability of the upper computers of the NC system by means of powerful software and hardware resources of the server, improving server capability and machining efficiency of the NC system and reducing production cost of enterprises.

The human-machine interactive module in the virtual host computer integrates utility software for providing virtual human-machine interactive interfaces for the HMI, and the specific working process is as follows:

(1) sending a login request to the virtual host computer by the HMI;

(2) sending the desktop image information of the virtual host computer to the HMI by the virtual host computer;

(3) redrawing a virtual interface on the screen of the HMI according to the desktop image information from the virtual host computer by the HMI;

(4) asking the virtual host computer to start a human-machine interactive application program through the virtual interface on the screen of the above HMI;

(5) establishing network connection between the human-machine interactive application program of the virtual host computer and the local lower computer;

(6) displaying the NC machining interface and sending the interface refreshing information to the HMI by the virtual host computer;

(7) instantaneously refreshing the virtual interface output by the HMI according to the interface refreshing information from the virtual host computer and providing a virtual NC machining operation interface for a user by the HMI;

(8) conducting machining operation on the virtual human-machine interactive interface of the HMI by a user, which is same to operation on a conventional NC system.

During machining operation, once the desktop image of the virtual host computer changes, corresponding refreshing information is sent to the HMI for instantaneously refreshing the virtual human-machine interactive interface.

According to the above information, the human-machine interactive interface operated by the user is essentially a picture which is a copy of the desktop image of the virtual host computer. The HMI is only used for receiving the user instruction and feeding back to the virtual host computer, and then the virtual host computer processes the user instruction to form a control signal, sends the control signal to the local lower computer and sends the refreshing information of the desktop image to the HMI, in other words, the HMI does not directly participate in but indirectly facilitates machining control through the virtual host computer.

In the embodiments, the human-machine interactive module is exploited preferably by employing a question markup language (QML) which is a descriptive script language supporting programming control in the form of JavaScript and mainly used for exploiting application programs mainly for user interfaces, and possesses the advantages of cross platform, good portability, short exploitation period, high expandability, smooth exploited interface and the like. The human-machine interactive module in the invention can be rapidly disposed on Windows, Linux and other systems without depending on a specific system or deployment environment. The human-machine interactive module actively makes a request for being connected with the local lower computer via a network in the starting process, and the human-machine interactive interface is normally displayed if connection is successful, or else starting is failed. After network connection is successful, the human-machine interactive interface automatically adjusts a display size according to a resolution of the interface of the virtual host computer so as to keep optimal display effect and fully guarantee using experience of an operator. The above human-machine interactive module is capable of conveniently integrating third-party software by employing the virtual host computer as a carrier, thereby flexibly facilitating function expansion and improvement of service capability of the NC system while improving the computing performance of the original NC system, and also facilitating an operator to expand functions of the NC system according to actual demands so as to enable the NC system to flexibly adapt to different application fields and on-site machining demands.

In order to guarantee the machining safety of a machine tool, the virtual host computers and the local lower computers are in one-to-one correspondence, so that resource of each virtual host computer can be individually configured according to machining demands of a corresponding machine tool, such as kernel performance, memory, hard-disk space, a demanded third-party software library and the like. Since one remote server, which is the host machine of the virtual host computer, provides service only for one local lower computer when the remote server is configured with only one virtual host computer, great resource waste is caused and production cost of enterprises is even increased, and therefore, the server in the present invention is configured with multiple virtual host computers which are mutually independent on the aspect of resource, so that the server can provide service for multiple local lower computers. Furthermore, a NC system with the conventional upper-computer and lower-computer combined architecture must be configured with at least one HMI, while in the present invention, one HMI can operate to simultaneously run multiple virtual human-machine interactive interfaces through remote desktop clients and accordingly can provide service for multiple NC systems, as shown in FIG. 4, thereby further reducing production cost of enterprises and facilitating unified monitoring and managing of NC machining in a workshop.

The NC system with the architecture slips into paralysis state once the upper computer is subjected to irreversible failure, while the upper computer in the invention can be rapidly recovered by means of the upper-computer system backup unit which is disposed at the remote server once encountering a failure, and thus the reliability of the NC system is improved. In the invention, the virtual kernel performance, the memory resource and the disk space of the virtual host computer are configured according to the machining demand of the local lower computer so as to guarantee fully effective utilization of resources of the server, and furthermore, the quantity of the virtual host computers disposed on the server is determined according to the total load possibly born by all of the virtual host computers, thereby preventing the server from operating under overload and further guaranteeing stability of the whole NC system. In the invention, the virtual host computer automatically enters sleep mode for reducing load of the server and improving the running performance of the unsleeping virtual host computers if the virtual host computer does not receive a feedback signal from the corresponding HMI or local lower computer for a period, and instantly wakes up and enters a normal work mode once receiving a service request from the corresponding HMI or local lower computer.

Since transmission and refreshing of real-time image data between the virtual host computer and the corresponding HMI generally occupy massive workshop network bandwidth and further influence transmission of control data and precision and stability of NC machining, the embodiments preferably utilize data lightweight technology for compressing image data transmitted in real time, thereby greatly reducing occupation rate of real-time image data on workshop network bandwidth and meeting demands of a common workshop network. The invention preferably employs a method of refreshing a rectangular region for solving the speed problem of refreshing the real-time image interface in real time by the client, and particularly, the virtual host computer only transmits the image information of the maximum rectangular region covering a changed region instead of the whole desktop to the corresponding HMI, and then the HMI correspondingly refreshes the changed interface region according to the refreshing information from the virtual host computer, thereby accelerating the refreshing speed of the human-machine interactive interface and fully guaranteeing the using experience of an operator while reducing transmission quantity of real-time data.

In the present invention, virtualization technology is utilized to facilitate application software to run on a virtual software and hardware platform so as to substantially improve performances, functions and intelligence degree of the NC system. Based on server virtualization technology, virtualization of the upper computer of the NC system is the most effective method for reaching the above purposes, and particularly the method comprises deploying the human-machine interactive module at the virtual machine of the remote server to form the virtual host computer for replacing a conventional local upper computer by utilizing the virtualization technology. The virtualization technology of the upper computer greatly promotes development of NC technology towards high-end intelligence when being applied to NC machining field and indirectly promotes continuous improvement of the application field. However, virtualization technology actually easily influences stability of the NC system, increases failure rate and test difficulty of the NC system and even influences precision of NC machining, which means the biggest technology difficulty of applying virtualization to the NC machining field is to guarantee stability of the NC system and machining stability. Also, transmission and processing of real-time image data are one of difficulties for virtualization of the upper computer since transmission of real-time image data occupies massive network bandwidth and accordingly influences transmission of real-time NC machining control data, reduces NC machining efficiency and influences using experience of an operator. Furthermore, virtualization of the upper computer faces great difficulty from exploitation of the human-machine interactive module, particularly, exploitation of the human-machine interactive module of a NC system faces many obstacles and requires a developer to look into the architecture of the NC system, and cross-platform exploitation of the human-machine interactive module is obstructed by factors such as non-cross-platform application frameworks, API of a specific operation system, non-cross-platform third-party library and the like since a conventional human-machine interactive module depending on a specific operation system needs massive labor for modification and porting once being required to run in a new environment or on a new operation system. In the present invention, aiming at the transmission problem of real-time image data, the NC system based on the virtual host computer utilizes a data compressing method facilitating high compression amount for reducing occupation rate of real-time image data transmission on network bandwidth of a workshop according to a data lightweight technology. Aiming at the redrawing problem of the real-time image, a frame buffer technology and a method for refreshing a rectangular region are employed for fully guaranteeing using experience of an operator. The reliability and the efficiency of NC machining are guaranteed by setting the virtual host computer preferentially processing machining data when conflicts occurred between NC machining data and a request signal to the virtual host computer from an operator, and also the invention employs a load equalization and optimization technology of clusters of the virtual host computers and an upper-computer system backup scheme for guaranteeing the stability of the NC system. The NC system employs QML technology for overcoming the problem that the human-machine interactive module depends on a specific operation system.

While preferred embodiments of the invention have been described above, it will be obvious to those skilled in the art that the invention is not limited to disclosure in the embodiments and the accompanying drawings. Any modification, equivalent alterations and improvements without departing from the spirit and the principle of the invention fall within the scope of the invention.

What is claimed is:

1. A numerical control system based on a virtual host computer for controlling numerical control (NC) machining of a machine tool by arranging an upper computer in a remote server as a virtual machine thereby forming the virtual host computer, configuring the virtual host computer and a local lower computer, and utilizing interaction thereof, the numerical control system comprising;
    the virtual host computer arranged at the remote server, the local lower computer, and a human-machine interactive device for human-machine interaction, the virtual host computer being connected with the human-machine interactive device and the virtual host computer respectively via a network, wherein,
    the human-machine interactive device operates to provide a human-machine interaction input/output interface allowing an NC machining instruction to be input;
    the virtual host computer integrates a human-machine interactive module for facilitating human-machine interaction, a non-real-time/half-real-time task execution unit for executing non-real-time/half-real-time tasks during NC machining, and a lower-computer control unit for controlling NC machining, and the virtual host computer receives the NC machining instruction input by the human-machine interactive device via the human-machine interactive module, processes the NC machining instruction via the non-real-time/half-real-time task execution unit thereby forming a machine-tool control instruction, and further transfers control data to the local lower computer via the lower-computer control unit by utilizing network transmission; and
    the local lower computer receives the control data from the virtual host computer and controls the machine tool to conduct real-time motion control and logic control;
    wherein the numerical control system is provided with multiple human-machine interactive devices respectively connected with the virtual host computer via a network thereby providing a human-machine interactive interface, human-machine interactive interfaces displayed by the human-machine interactive devices corresponding to the virtual host computer are synchronous, and the human-machine interactive device is capable of simultaneously running human-machine interactive interfaces corresponding to multiple different virtual host computers.

2. The numerical control system based on a virtual host computer of claim 1, wherein an interface displayed by the human-machine interactive device is a virtual interface generated by obtaining information from the virtual host computer by the human-machine interactive device, and is essentially a copy of the interface of the virtual host computer.

3. The numerical control system based on a virtual host computer of claim 1, wherein generation of the virtual interface on the human-machine interactive device is facilitated in a manner of refreshing a rectangular region.

4. The numerical control system based on a virtual host computer of claim 1, wherein the human-machine interactive device is arranged locally or at any position that a network can reach.

5. The numerical control system based on a virtual host computer of claim 1, wherein the human-machine interactive device is a portable terminal.

6. The numerical control system based on a virtual host computer of claim 1, wherein a single remote server comprises multiple virtual host computers respectively corresponding to multiple local lower computers, so that one single remote server provides services for multiple local lower computers.

7. The numerical control system based on a virtual host computer of claim 1, wherein the virtual host computer is backed up via a remote server to which the virtual host computer belongs.

8. The numerical control system based on a virtual host computer of claim 1, wherein the human-machine interactive module integrated in the virtual host computer possesses a cross-platform characteristic, and correspondingly the system comprises Windows, Linux, or Android.

9. The numerical control system based on a virtual host computer of claim 1, wherein a display interface of the human-machine interactive device is adjustable according to a desktop resolution of the virtual host computer, so as to adapt to display devices with different sizes.

* * * * *